No. 751,583. PATENTED FEB. 9, 1904.
T. WARSOP.
MEANS FOR COUPLING RAILWAY WAGONS, CARRIAGES, &c.
APPLICATION FILED MAR. 2, 1903.
NO MODEL.
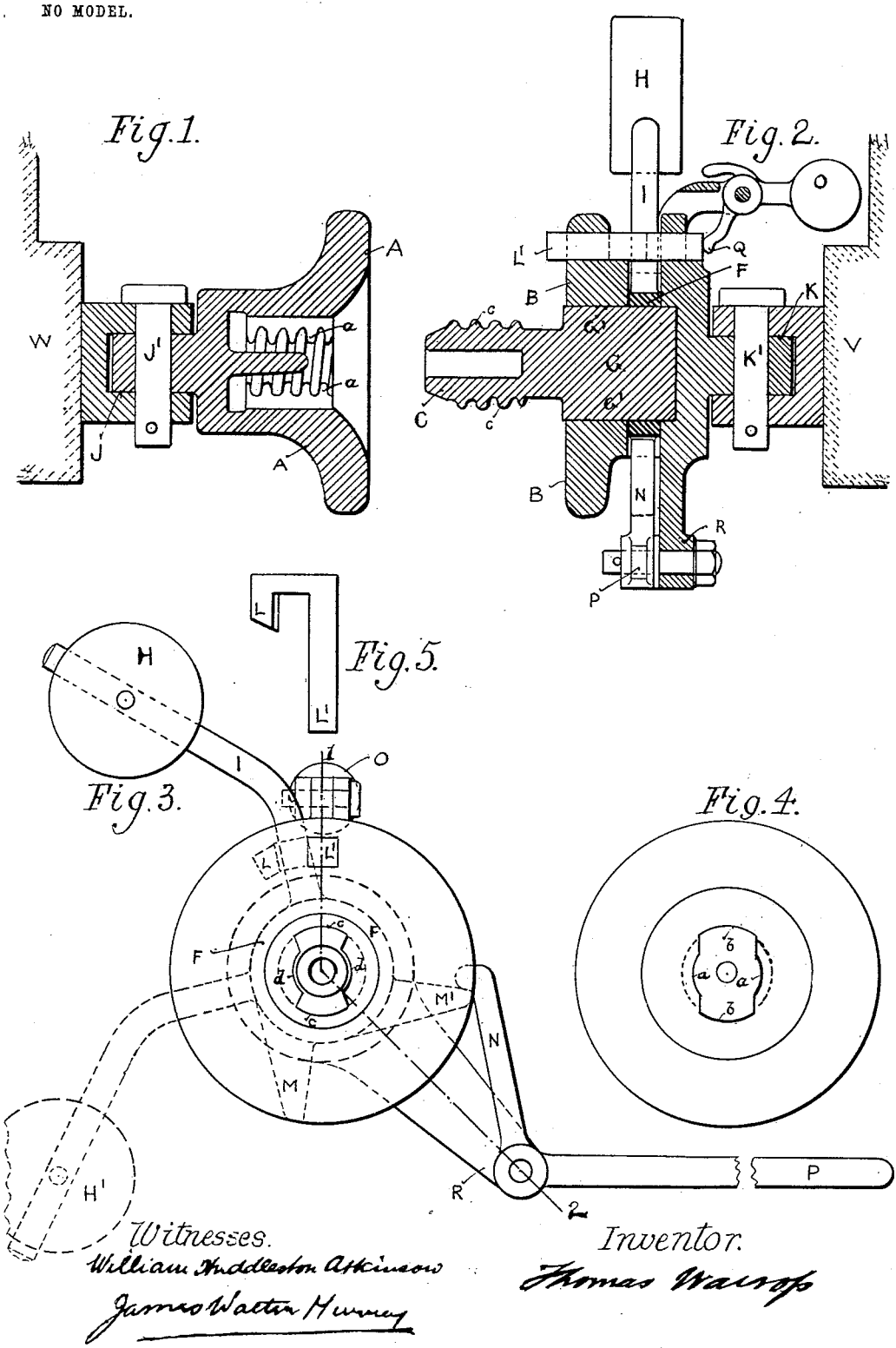

No. 751,583. Patented February 9, 1904.

UNITED STATES PATENT OFFICE.

THOMAS WARSOP, OF CONISTON, ENGLAND.

MEANS FOR COUPLING RAILWAY WAGONS, CARRIAGES, &c.

SPECIFICATION forming part of Letters Patent No. 751,583, dated February 9, 1904.

Application filed March 2, 1903. Serial No. 145,866. (No model.)

*To all whom it may concern:*

Be it known that I, THOMAS WARSOP, a subject of the King of Great Britain and Ireland, and a resident of Coniston, in the county of Lancaster, England, have invented a certain new and useful Means of Coupling Railway Wagons, Carriages, and the Like, (for which I have applied for a patent in Great Britain, No. 14,350, bearing date June 25, 1902,) of which the following is a specification.

My invention relates to improvements in automatic couplings for railway wagons, carriages, and the like whereby the present dangerous practice of coupling by hand or otherwise is dispensed with. I attain these objects by the mechanism illustrated in the accompanying drawings, in which—

Figure 1 is a vertical section of one half of the coupling called the "female" coupling. Fig. 2 is a vertical section of the other half of the coupling, called the "male" coupling, on line 1 2 of Fig. 3. Fig. 3 is a front elevation of the male coupling. Fig. 4 is a front elevation of the female coupling, and Fig. 5 is a plan of the catch L.

Similar letters of reference refer to similar parts throughout the several views.

In the figures, A is a bell-shaped buffer-coupling attached to the center of wagon W by the hinged joint J and pin J' and having two or more screw-threads or projections $a\,a$ formed internally therein at each side of the coupling A, each of a width rather less than one-fourth of the circumference of the aperture in the coupling, the other portions $b\,b$ of the circumference of the threads or projections—top and bottom—being cut away, so as to admit into the apertures $b\,b$ the plunger C of the male coupling B, fixed on the end of another wagon V or like to be coupled, as described below.

At the center of the end of wagon V, I attach another cylindrical buffer-coupling B by the hinged joint K and pin K'. This has a horizontal plunger C turning in the center of same, and also formed with two or more screw-threads or projections $c\,c$, formed thereon top and bottom, each of a width rather less than one-fourth of the circumference of the plunger C, the other portions $d\,d$ of the circumference of the threads or projections at each side being likewise cut away, so as to enter freely into the buffer-coupling A of the adjoining wagon W or the like. This plunger C is formed with a collar F and stalk G at one end, the latter of which is carried in a bearing G', attached to the wagon V, and is capable of turning in this bearing one-quarter of a revolution or so. The collar F on the plunger C is fitted with a balance-weight H, carried by a stalk I, attached to the collar F, which when the wagons are uncoupled is held in a vertical or other required position by the bolt or self-acting catch L, carried from the buffer-coupling B and fitted with lever Q and weight O to bring it into action as required. This bolt or catch L is pushed back by the female coupling A pushing in the end L', so as to release the stalk I and weight H held in position by it, and the action of the whole arrangement is as follows: When the two wagons W and V are pushed one to the other for coupling together, the plunger C of the male coupling B enters the female coupling A, and the screw-threads $a\,a$ and $c\,c$ on each of same pass into the spaces $b\,b$ and $d\,d$ cut away on both, and while this is taking place the female coupling A pushes back the catch-bolt L on the other coupling B, and thereby releases the balance-weight H, which in falling to the position H' (shown by dotted lines in Fig. 3) causes the plunger C (to the collar F of which it is attached) to turn round on its axis a quarter of a revolution or so, and in so turning the screw-threads or projections $c\,c$ of the plunger C enter into or interlock with the screw-threads or projections $a\,a$ on the interior of the female coupling A. This interlocking action firmly and automatically couples the two wagons together, and they can only be released again by raising the balance-weight H up to an upright position, where they are held by the self-acting catch L, before mentioned, which is forced into action again by the lever Q and weight O. This action turns back the plunger C again to its original position, so as to release the screw-threads or projections in each coupling one from the other, and automatically uncouples the wagons or the like.

The balance-weight H is raised from the position H' to an upright position by raising the handle P and lever N, fulcrumed from R, which acts against the cam M, formed on the collar F, and this lever is also used to hold the balance-weight in an upright position, and so prevent the wagons being automatically coupled while being shunted or when not so required to be coupled.

Having now described my invention, what I claim as new, and desire to secure by Letters Patent, is—

1. In combination, a pivoted draw-head having a socket provided with shoulders, a pivoted draw-head having a shouldered projection rotatably mounted therein, a weighted arm extending from the projection, and a retractable catch-bolt on the last-named draw-head normally locking the projection against rotation and movable by engagement with the first-named draw-head to release the projection.

2. The combination in couplings for railway-wagons and the like of projections *a a* and *c c*, catch-bolt L, the weight H, plunger C with the cam M, levers N and P, substantially as shown, for the purpose specified.

THOMAS WARSOP.

Witnesses:
   WILLIAM HUDDLESTON ATKINSON,
   JAMES WALTER MURRAY.